United States Patent [19]
Houtz

[11] Patent Number: 5,974,801
[45] Date of Patent: *Nov. 2, 1999

[54] TURBOCHARGER CONTROL SYSTEM

[75] Inventor: Phillip J. Houtz, Lafayette, Ind.

[73] Assignee: Caterpillar Inc., Peoria, Ill.

[ * ] Notice: This patent is subject to a terminal disclaimer.

[21] Appl. No.: 09/131,920

[22] Filed: Aug. 10, 1998

Related U.S. Application Data

[62] Division of application No. 08/668,167, Jun. 21, 1996, Pat. No. 5,873,248.

[51] Int. Cl.⁶ ........................................ F02B 37/18
[52] U.S. Cl. ................................................ 60/602
[58] Field of Search .......................... 60/600, 601, 602, 60/603; 123/357

[56] References Cited

U.S. PATENT DOCUMENTS

| | | | |
|---|---|---|---|
| 3,576,102 | 4/1971 | West . | |
| 4,005,579 | 2/1977 | Lloyd | 60/602 |
| 4,169,355 | 10/1979 | Walsham | 60/682 |
| 4,211,081 | 7/1980 | Yamada | 60/602 |
| 4,368,705 | 1/1983 | Stevenson et al. | 123/357 |
| 4,679,398 | 7/1987 | Nishiguchi | 60/602 |
| 4,697,421 | 10/1987 | Otobe | 60/602 |
| 4,848,086 | 7/1989 | Inoue | 60/602 |
| 5,033,268 | 7/1991 | Hitomi | 60/605.1 |
| 5,063,744 | 11/1991 | Ishiyama | 60/600 |
| 5,090,202 | 2/1992 | Hitomi | 60/602 |
| 5,121,604 | 6/1992 | Berger | 60/602 |
| 5,123,246 | 6/1992 | Younessi | 60/602 |
| 5,140,817 | 8/1992 | Matsuda | 60/612 |
| 5,155,998 | 10/1992 | Monden | 60/602 |
| 5,174,119 | 12/1992 | Hanauer | 60/602 |
| 5,199,261 | 4/1993 | Baker | 60/612 |
| 5,224,853 | 7/1993 | Kazuo et al. | 60/602 |
| 5,551,236 | 9/1996 | Zimmer et al. | 60/605.1 |
| 5,755,101 | 5/1998 | Free et al. | 60/602 |

*Primary Examiner*—Michael Koczo
*Attorney, Agent, or Firm*—Alan J. Hickman

[57] ABSTRACT

A system for controlling boost pressure at various different altitudes of operation of a turbo charged internal combustion engine includes a wastegate valve, an actuator and a controller. Signals delivered from an engine speed sensor, a boost pressure transducer and a barometric pressure sensor are processed in the controller. A control signal delivered from the controller to the actuator controls the position of the wastegate valve, bypass of exhaust gasses and the speed of the turbocharger.

6 Claims, 5 Drawing Sheets

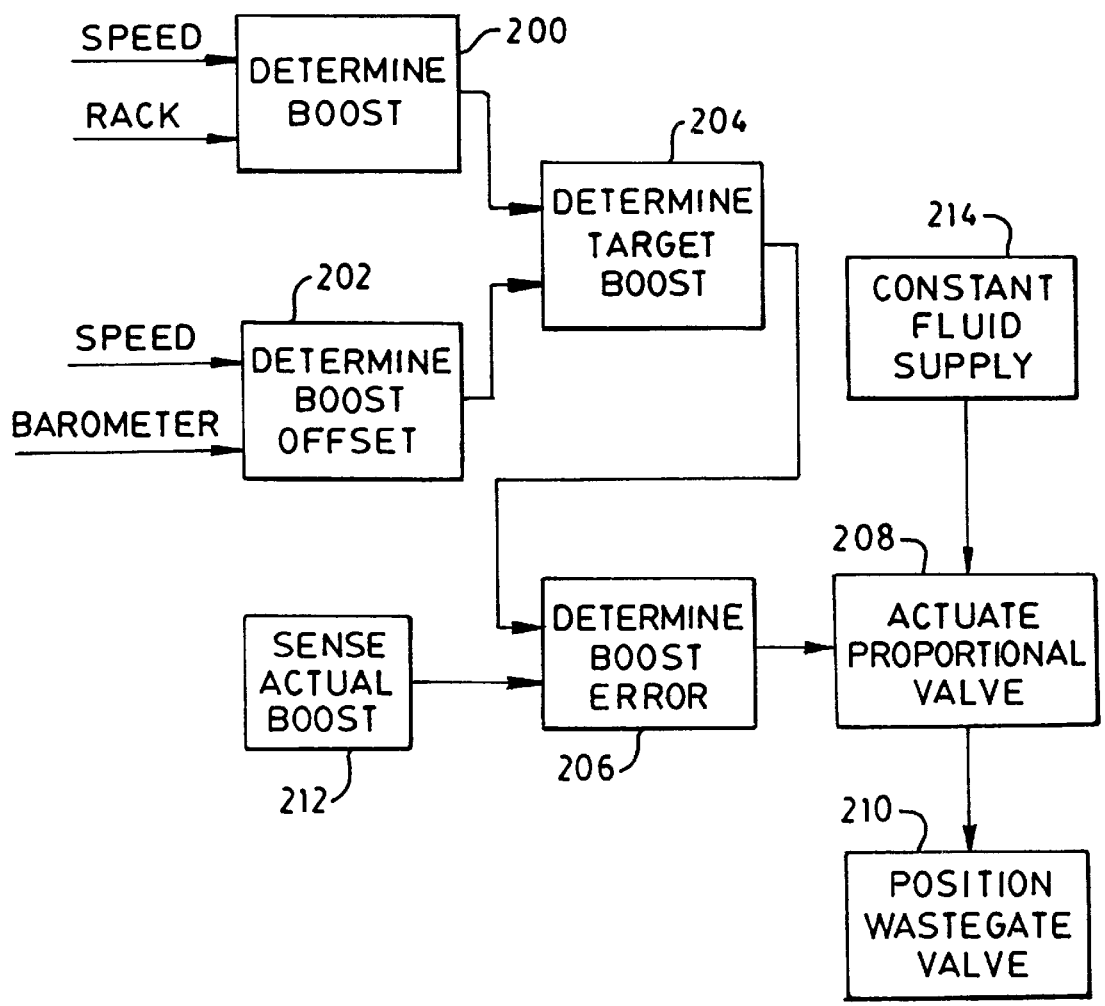

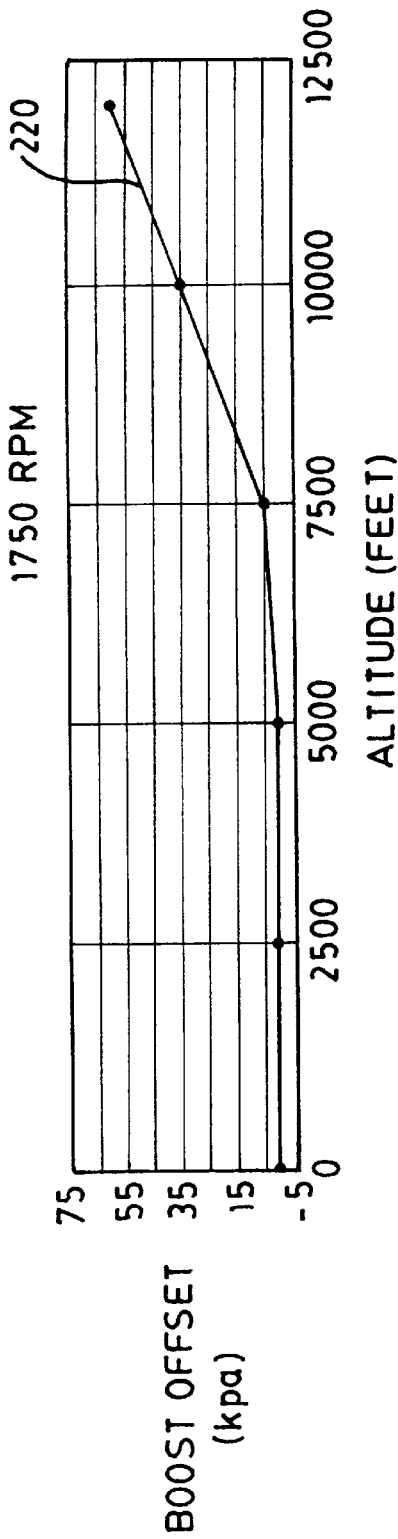
Fig-3- BOOST OFFSET VS ALTITUDE 1750 RPM
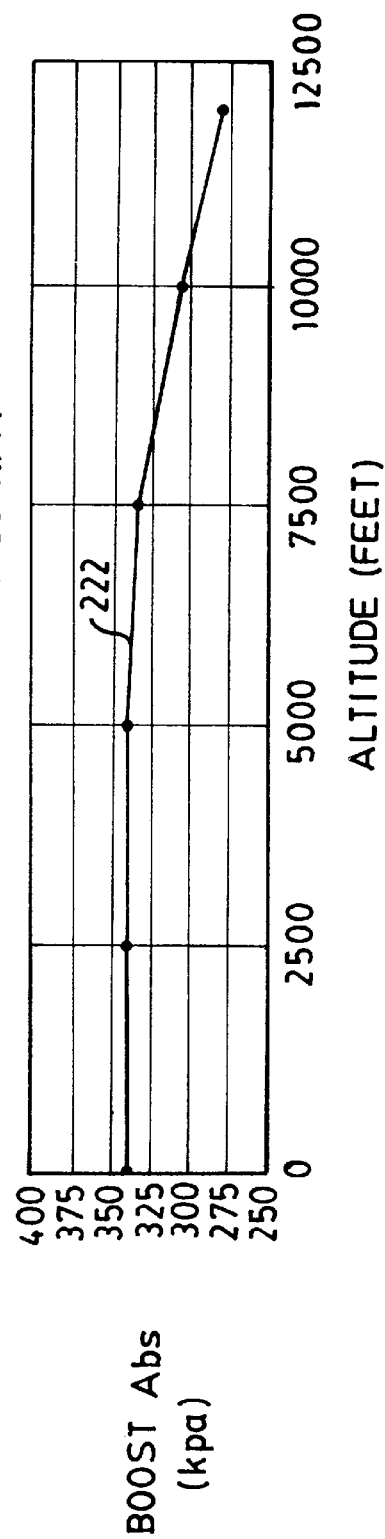
Fig-4- TARGET BOOST VS ALTITUDE 1750 RPM

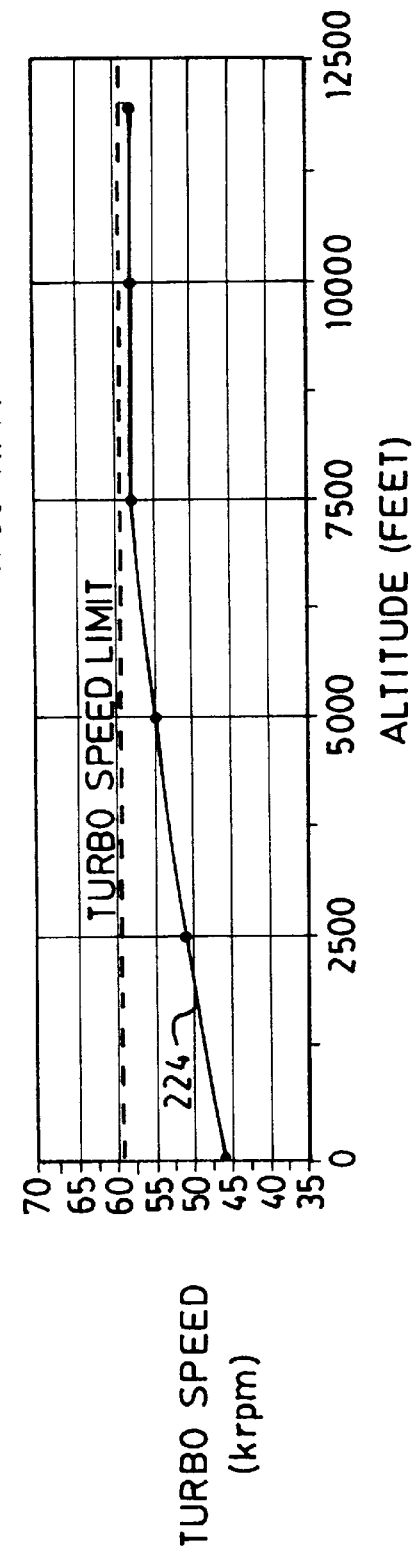
Fig-5- TURBO SPEED VS ALTITUDE 1750 RPM
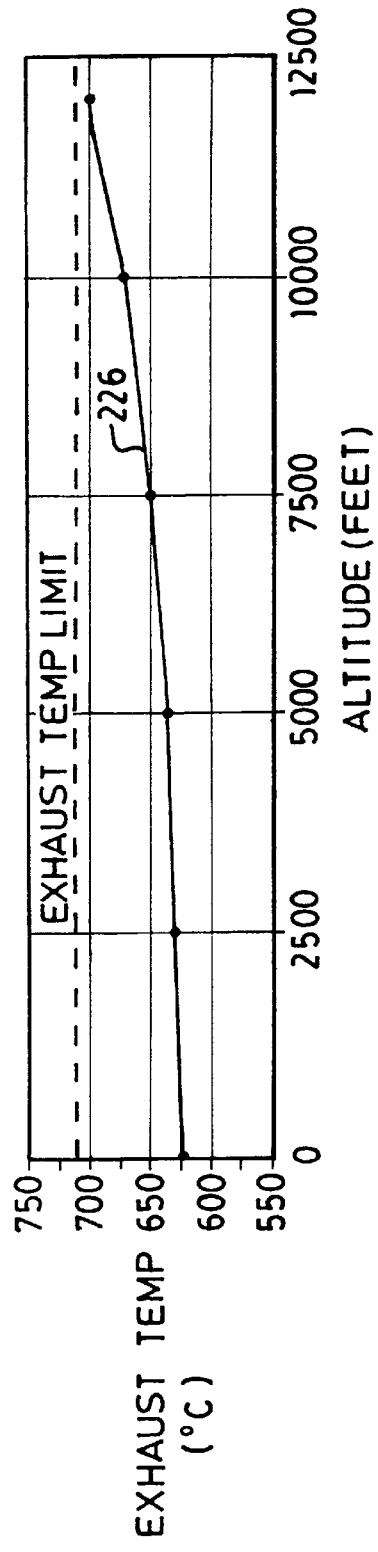
Fig-6- EXHAUST TEMPERATURE VS ALTITUDE 1750 RPM

TURBOCHARGER CONTROL SYSTEM

This is a divisional application of application Ser. No. 08/668,167, filed Jun. 21, 1996, now U.S. Pat. No. 5,873,248.

TECHNICAL FIELD

This invention relates to a turbocharger control system and more particularly to a control system for controlling the amount of air delivered by turbocharger to an internal combustion engine at different altitudes of engine operation.

BACKGROUND ART

Turbocharged engines of the type used primarily in off highway trucks often have a pneumatically actuated wastegate valve for controlling the turbocharger speed and thus the boost pressure delivered to the intake manifold of the engine. The wastegate valve is normally disposed in the exhaust system of the engine and controls the speed of the turbocharger by modifying the volume of exhaust gasses directed to the turbine section of the turbocharger.

U.S. Pat. No. 4,697,421 dated Oct. 6, 1987 to Yutaka Otobe et.al. discloses a wastegate valve for bypassing engine exhaust flow from the turbine section and thereby control boost pressure. The waste gate is moved by a pneumatic actuator controlled by a control valve which varies the wastegate valve opening pressure based on boost pressure and intake manifold temperature. Maintaining the boost pressure at a target pressure may improve engine operating conditions and reduce engine knock at a given altitude. However, since there is no compensation for operating at different altitudes, the loss of boost at high altitudes and over boost at lower altitudes and ambient temperatures may occur. Therefore optimum operation of the engine is not achieved.

Wastegate valves have been successful in protecting the engine from excessive boost (peak cylinder pressure) at low altitudes (ambient temperatures) but have not been successfully used in situations where precision modulation of the wastegate valve is required. State of the art fluid operated wastegate control systems lack the responsiveness and accuracy required for good modulation. Therefore, in order to provide a higher degree of optimization of wastegate valve operation a more responsive and accurate control system must be provided.

In order to optimize wastegate control, maintain lower exhaust temperatures, and provide the right amount of boost at various air densities (different altitudes and different ambient air temperatures) it is necessary to provide a control system which considers various related control parameters. At present such a control system has not been provided.

DISCLOSURE OF THE INVENTION

A control system for controlling the turbocharger boost pressure of an internal combustion engine at various different altitudes is provided. The engine has an intake manifold and an exhaust manifold respectively connected to a compressor section and a turbine section of a turbocharger. A wastegate valve connected between the exhaust manifold and the turbine section is movable between an open position at which fluid flow exhausted by the engine is free to bypass the turbine and a closed position at which fluid flow exhausted by the engine is restricted from bypassing the turbine. A first sensor senses the speed of the engine and delivers a responsive speed signal. A second sensor senses a boost pressure of the engine and delivers a responsive boost signal. A third sensor senses a rack position of the engine and delivers a responsive rack position signal. A fourth sensor senses a barometric pressure and delivers a responsive barometric pressure signal. A controller connected to the first, second, third and forth sensors receives the speed, boost, rack position and barometric pressure signals, determines a boost error based on the speed, boost, rack position and barometric pressure signals, and delivers a responsive control signal. An actuator receives the control signal, responsively moves the wastegate valve toward one of the open and closed positions, and changes the amount of boost delivered from the turbocharger to the intake manifold of the engine.

BRIEF DESCRIPTION OF THE DRAWINGS

FIG. 2 is a flow chart showing the control system control logic;

FIG. 3 is a graph showing Boost Offset vs. Altitude at an engine speed of 1750 rpm;

FIG. 4 is a graph showing Target Boost vs. Altitude at an engine speed of 1750 rpm;

FIG. 5 is a graph showing Turbo Speed vs. Altitude at an engine speed of 1750 rpm;

FIG. 6 is a graph showing Exhaust Temperature vs Altitude at an engine speed of 1750 rpm;

BEST MODE FOR CARRYING OUT THE INVENTION

Figure 1:
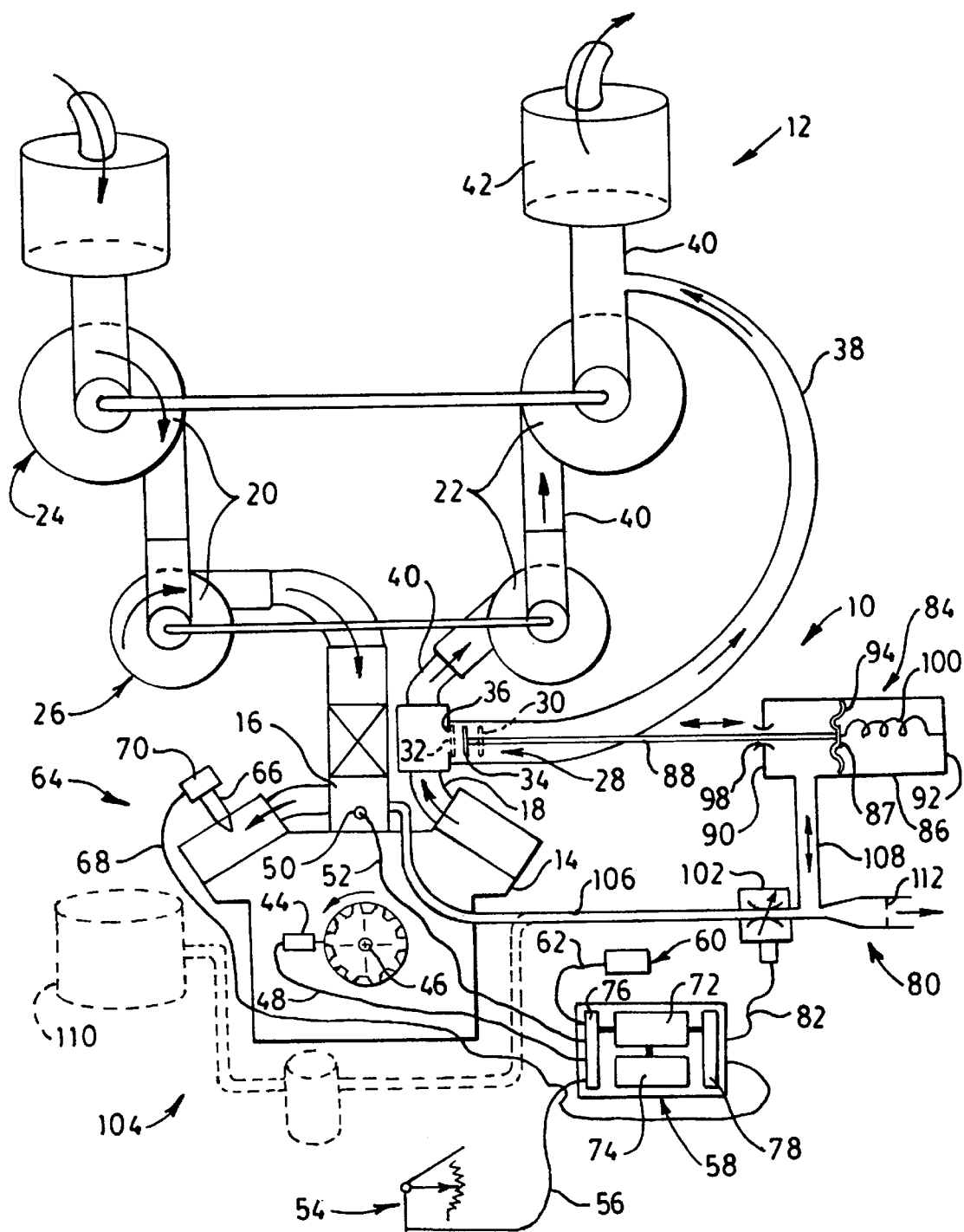
FIG. 1 is a schematic drawing of an embodiment of the present invention showing a turbo charged internal combustion engine, a wastegate valve, and a control system for controlling the wastegate valve.

With reference to the drawings and particularly FIG. 1, a control system 10 for controlling the boost pressure of a turbocharger 12 of an internal combustion engine 14, for example a diesel engine, at various different altitudes is shown. The engine 14 has an intake manifold 16 and an exhaust manifold 18 respectively connected to compressor 20 and turbine 22 sections of the turbocharger 12. The turbocharger 12 of the specific embodiment consists of two turbochargers connected in series, a low pressure turbocharger 24 and a high pressure turbocharger 26 each having a compressor 20 and turbine 22 section. As is well known in the art, in order to cover a full range of engine operating requirements, different altitudes and temperatures affect engine boost requirements, two turbochargers are often provided.

A wastegate valve 28 connected between the exhaust manifold 18 and the turbine section 22 is movable between an open position 30 at which fluid flow exhausted by the engine 14 is free to bypass the turbine 22 and a closed position 32 at which fluid flow exhausted by the engine 14 is restricted from bypassing the turbine 22. The wastegate valve 28 bypasses exhaust fluid flow at the open position and at positions between the open 30 and closed 32 positions. Since the wastegate valve is infinitely variable, positions between open and closed determine different bypass characteristics. It is to be noted that at the closed position 32 the wastegate valve 28 may not be fully closed and some of the exhaust gasses may bypass the turbine section 22. Similarly, at the open position the wastegate valve 28 may not be fully open to bypass all of the exhaust gasses. The open and closed positions may be likened to two different orifice sizes with intermediate orifice sizes being provided at locations therebetween.

The wastegate valve 28 is shown as having a linearly movable disc 34 and fixed seat 36, however, other configurations such as butterfly and flapper type valves are equivalents and within the scope of the invention. The wastegate valve 28 is disposed in a bypass conduit 38 which is teed into the exhaust ducting 40 between the exhaust manifold 18 and the turbine section 22. The bypass conduit 38 is connected to the exhaust manifold 18 in parallel with the turbine section 22. Exhaust gasses bypassed by the wastegate valve 28 are directed by the bypass conduit to the muffler 42 disposed in the exhaust ducting.

A first means 44 senses the speed of the crankshaft 46 of the engine 14 and delivers a responsive digital speed signal via a conductor 48. The first means 44 may include any suitable transducer, for example, a magnetic pick-up and an adjacent toothed wheel. The transducer is connected to the engine and the toothed wheel is mounted on the engine crankshaft 46.

A second means 50 senses the boost pressure of the engine and delivers a responsive boost signal via conductor 52. The second means 50 may include a pressure transducer of any suitable commercially available type connected to and disposed into the intake manifold 16. The boost signal is analog and corresponds in magnitude to the boost pressure at the intake manifold.

A third means 54 senses a rack, position of the engine and delivers a responsive rack position signal via conductor 56. Rack position when used in conjunction with internal combustion engines having electronically controlled fuel injectors indicates a selected amount of fuel being supplied to the engine. This selected amount of fuel is based on, for example, operator input. The third means 54 may include an operator command input device the analog or digital type. For example, the position based on operator input of a lever or pedal connected to operate a potentiometer or encoder. The analog or digital device establishes the engine power demanded by the vehicle operator and commands a control means 58 to establish engine rack position. It is to be noted that rack position signal may be obtained directly from the control means. This is equivalent and within the spirit of the meaning of third means 54.

A fourth means 60 senses a barometric pressure of the engine environment and delivers a responsive barometric pressure signal of either the analog or digital type via conductor 62. The forth means 60 may include any suitable commercially available barometric pressure sensor. As is known by those skilled in the art, barometric pressure varies with altitude is thus proportional thereto. The barometric pressure signal may be converted to altitude for reasons of processing.

A fuel injecting system 64, including a plurality of fuel injectors 66 (only one shown) of any suitable construction, distributes fuel to power the engine 14. The fuel injecting system 66 is connected to the control means 58 via conductor 68 and under electronic control thereof. The fuel injectors 66 are preferably controlled by commercially available electrohydraulic valves 70 (only one shown) which respond to signals delivered by the control means 58. The injectors deliver fuel to the engine based on control signals from the control means 58.

The control means 58 is connected to the first, second, third and forth sensing means 44,50,54 and 60 via conductors 48,52,56 and 62 for receiving said speed, boost, rack position and barometric pressure signals. The control means 58 includes a processor 72, a memory 74, a analog to digital converter 76 for converting analog signals, if required, and a driver 78 for driving an actuator means 80. The control means 58 is responsive to these control signals for determining a boost error based on the speed, boost, rack position and barometric pressure signals and deliver a responsive control signal.

The actuator means 80 receives the control signal via conductor 82 connected between the control and actuator means 80 means and responsively moves the wastegate valve 28 toward one of the open and closed positions and thereby changes the amount of boost delivered from the turbocharger 12 to the intake manifold 16 of the engine 14.

As best seen in FIG. 2, the logic for controlling the wastegate valve 28 is show in substantial detail. The processor 72 determines boost, for example, by selecting a boost value from a boost map 200 (or lookup table) based on the speed and rack position signals.

The processor 72 determines a boost offset, for example, by selecting a boost offset value from a boost offset map 202 (or lookup table) based on speed and barometric pressure. It should be recognized that the processor may convert barometric pressure to altitude. In such cases the boost offset map is based on speed and altitude.

The processor combines the boost offset and boost values in box 204 and to obtain a target boost value. The boost error in box 206 is determined as a difference between actual and target boost values ($Boost_{actual} - Boost_{target} = Boost_{error}$). The actual boost, box 212, is the boost being sensed by the second means 50 and delivered to the processor 72. Additional information related to the logic of wastegate valve control will be subsequently discussed.

As shown in FIG. 3, the boost offset value at 1,750 rpm, as shown by curve 220, varies with altitude between approximately −5 and 65 kpa. From an examination of the curve 220, and as one may expect, the change in boost offset is greatest between 5,000 and 12,500 ft. A family of separate boost offset curves exist for the other engine speeds. The boost offset value in box 202, FIG. 2, is selected from a boost offset map, look-up table, or the like for the sensed engine speed and barometric.

Figure 7:
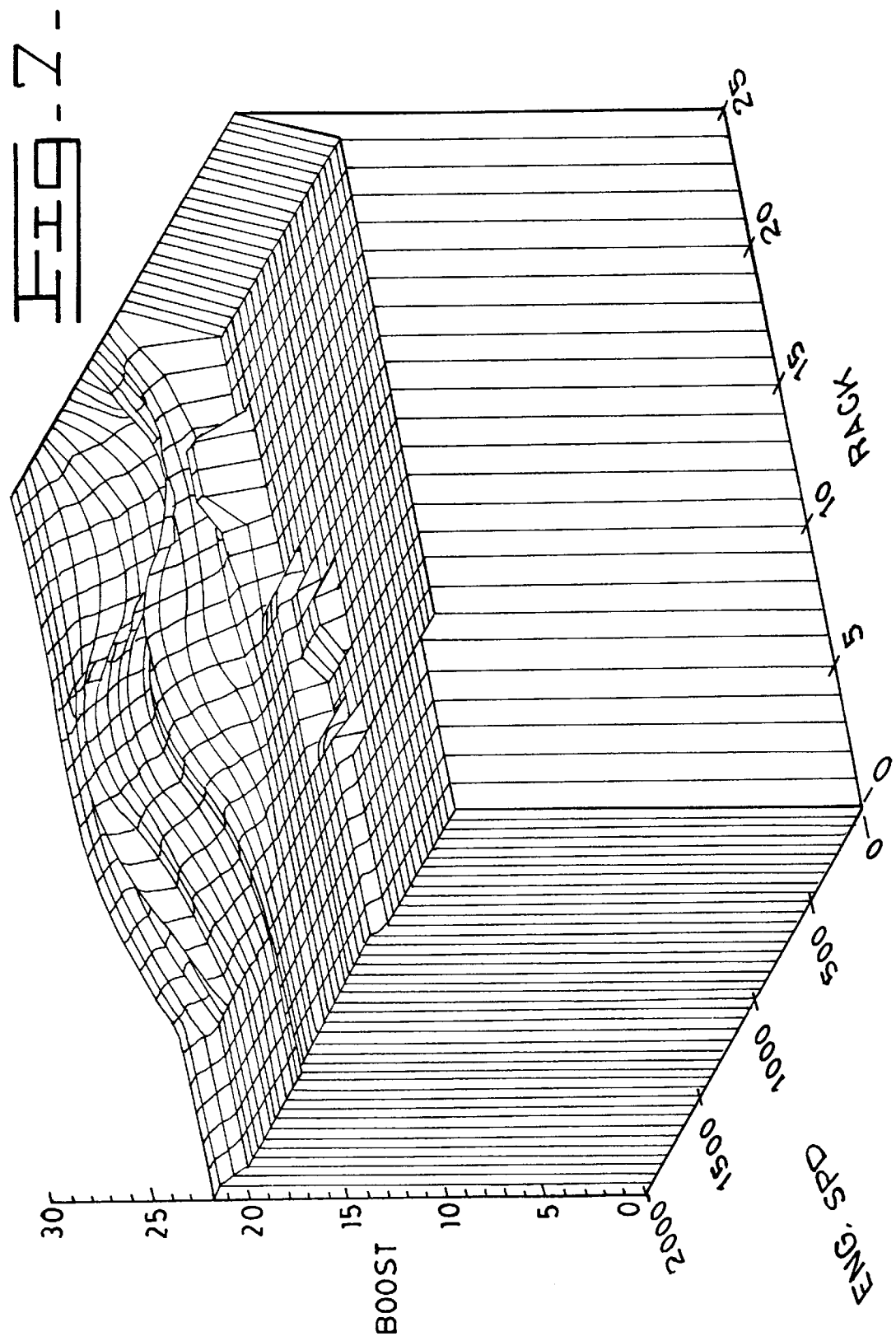
FIG. 7 is a three dimensional Boost Map with boost, engine speed and rack position as the coordinates.

Referring to FIG. 7, a three dimensional boost map is shown in substantial detail. The boost value for a particular engine speed and rack position may be easily determined. As indicated in box 200, the boost value for a sensed speed and rack position is determined, such as from a boost map, look-up table and the like. This boost value is subsequently used in the determination of target boost.

As shown in FIG. 4, the target boost value at 1,750 rpm, as shown by curve 220, varies with altitude between approximately 275–350 kpa. From an examination of the curve 220, and as one may expect, the change in boost offset is greatest between 5,000 and 12,500 ft. A family of separate target boost curves exist for the other engine speeds. The target boost value in box 204, FIG. 2, is selected from a target boost map, look-up table, or the like based on the boost and offset boost determined in boxes 200 and 202, respectively.

As shown in the graphs of FIGS. 5 and 6, turbocharger speed and engine exhaust temperature, are each plotted with respect to altitude. As can be seen in FIG. 5, at an engine speed of 1,750 rpm., the turbocharger speed curve 224 increases with altitude until about 7,500 ft. Turbocharger speed increases above 7,500 ft. are prevented. Similarly, as can been seen in FIG. 6, at an engine speed of 1,750 rpm, the exhaust temperature curve 226 increases with altitude until it nears 12,500 ft. As can be appreciated, limitations to turbocharger speed and engine exhaust temperatures are established to prevent premature wear and damage to the turbocharger and engine. Like discussed above, there is a family of curves related to curves 224,226 for other engine speeds.

It should be noted that the control means 58 safeguards turbocharger operation by preventing the turbocharger from exceeding speed and temperature limits even when additional boost would increase power.

Referring to FIG. 1, the actuator means includes a linear actuator 84 having a cylindrically tubular housing 86, a piston 87, and rod 88 connected to the piston 87 and wastegate valve 28. The rod 88 is slidably axially movably connected to the housing 86. The housing 86 has first and second ends 90,92. The linear actuator 84 has a diaphragm 94 connected to the piston rod 88 and the housing 86 at a location between said first and second housing ends 90,92. The diaphragm 94 is in sealing engagement with the housing 86 and rod 88 and defines a chamber 96 in the housing 86. The first end 90 has an sealed opening 98 of a preselected diameter therein. The rod 88 has a preselected diameter and extends through the opening 98. The diameter of the rod 88 is smaller than the diameter of the sealed opening 98 and defines a predetermined clearance therebetween. The predetermined clearance defines a controlled leakage path between the chamber 96 and the atmosphere. A spring 100 is provided to urge the wastegate valve to a predetermined neutral position. The neutral position is shown as being between the opened 30 and closed 32 positions, however, other positions, such as being at the open and closed may be selected to provide the operating characteristics desired at the neutral position.

The actuator means 80 includes a proportional valve 102. The proportional valve 102 is connected to a source of pressurized fluid flow 104 by a first conduit 106 and to the housing 86 by a second conduit 108. The first conduit delivers pressurized fluid flow from the source 104 to the proportional valve 102 and the second conduit delivers pressurized fluid flow from the proportional valve 102 to the chamber conduits 106 and 108. The proportional valve 102 is preferably a solenoid operated proportional air valve of conventional design and is connected to the control means 58 by conductor 82. The proportional valve 102 receives control signals delivered from the control means 58 by way of conductor 82 and responsively modulates the pressurized fluid flow delivered from the source 104 of pressurized fluid flow to the housing 86.

The source of pressurized fluid flow 104 may be either an independent air supply, for example an air compressor 110. Alternatively, the inlet air provided to the engine 14 may be the source of pressurized fluid flow 104. Conduit 108 connects either the compressor 110 to the proportional valve 102 or the intake manifold 16 to the proportional valve 102.

A fixed orifice 112 of a predetermined sized is connected to the second conduit 108 and in a parallel fluid passing relationship with the second conduit 108. The fixed orifice 112 bleeds off a portion of the pressurized fluid flow delivered to the second conduit 108 by the proportional valve 102 and establishes a control flow rate in combination with the pressurized fluid flow passed by the proportional valve 102.

The fluid pressure in second conduit 108 and in the chamber 96 acts on the piston 87 and diaphragm 94 and causes the rod 88 to move relative to the housing 86. This movement of the rod 88 causes the wastegate valve 28 to move between the open and closed positions. The difference between the force caused by fluid pressure acting on the piston 87 and diaphragm 94 and the force of spring 100 determines the location of the rod 87 and the position of the wastegate valve 28. The combination of the orifice 80 and the proportional valve 102 enables accurate positioning of the wastegate valve 28. The control means 58, in delivering a control signal via conduit 82 to the proportional valve 102, establishes a control pressure in chamber 96 and thereby determines the wastegate valve position.

As shown in FIG. 2, the control signal delivered is related to boost error, box 206. As a result, the control signal delivered moves the proportional valve 102, box 208, an amount sufficient to establish a fluid flow rate adequate to move the rod 88 to a position at which an appropriate amount of exhaust flow is bypassed by the wastegate valve 28, box 210. The substantially constant pressure fluid supply 104, box 214, is regulated by the proportional valve 102 and to position the wastegate valve 28. In situations where a large boost increase is required the control signal delivered is of a magnitude greater than when a small boost increase is required. This results in a proportional response time in wastegate valve 28 valve opening. The control signal is preferably an analog signal having a magnitude proportional to the desired position of the proportional valve 102.

Industrial Applicability

The control system 10 optimizes the amount of turbocharger boost provided to the engine 14 at various different altitudes without exceeding temperature and turbocharger speed limits.

The control system in utilizing barometric pressure (altitude) as one of the control parameters achieves improved performance of the engine 14 at different altitudes and overcomes the problems associated with insufficient or excessive boost.

In operation, the control system 10, controls intake manifold 16 boost at different altitudes of the turbo charged internal combustion engine 14 by sensing engine speed, boost, rack position, and barometric pressure and controls the wastegate valve 28 based on these signals and in accordance with preprogrammed instructions.

The control means 58 determines the target boost value based on engine speed, rack position and altitude, the boost error between the actual sensed boost value and target boost value, and changes the amount of boost delivered from the turbocharger to the intake manifold in response to the boost error by controlling the wastegate valve position and the bypassing of exhaust gasses.

In determining target boost, the control means 58 selects a boost value from a boost map, a boost offset value from a boost offset map, combines the boost and boost offset values selected, and determines a target boost value from the selected boost and offset boost values. The boost error is determined by reducing the sensed actual boost value by the target boost value.

If the boost error be negative, the control signal delivered from the control means 58 to the proportional valve 102 will cause the proportional valve to reduce fluid flow passed to conduit 108 and thereby bleed fluid from chamber 96 and cause the wastegate valve 28 to move to the closed position. If the bleed error is positive, the control signal delivered from the control means 58 to the proportional valve 102 will cause the proportional valve 102 to increase fluid flow passed to conduit 108 and thereby add fluid to chamber 96 and cause the bleed valve to move toward the open position.

The aforementioned control of the wastegate valve by the control means 58 and actuator means 80 results in accurate and responsive control of engine boost pressure.

Other aspects, objects and advantages of the present invention can be obtained from a study of the drawings, the disclosure and the appended claims.

I claim:

1. A control system, for controlling turbocharger boost pressure of an internal combustion engine at various different altitudes, said engine having an intake manifold and an exhaust manifold respectively connected to a compressor section and a turbine section of a turbocharger, comprising:

a wastegate valve connected between said exhaust manifold and said turbine section, said wastegate valve being movable between an open position at which fluid flow exhausted by the engine is free to bypass the turbine and a closed position at which fluid flow exhausted by the engine is restricted from bypassing the turbine;

first means for sensing a speed of the engine and delivering a responsive speed signal;

second means for sensing a boost pressure of the engine and delivering a responsive boost signal;

third means for sensing a rack position of the engine and delivering a responsive rack position signal;

fourth means for sensing a barometric pressure and delivering a responsive barometric pressure signal;

control means connected to said first, second, third and fourth sensing means for receiving said speed, boost, rack position and barometric pressure signals, determining a boost error based on actual and target boost values for said speed, boost, rack position and barometric pressure signals, and delivering a responsive control signal;

actuator means for receiving said control signal, responsively moving said wastegate valve toward one of the open and closed positions, and to a position between the open and closed positions;

said actuator means including:

a linear actuator having a housing and a rod connected to the wastegate valve and slidably connected to said housing, said housing having first and second ends, said linear actuator having a diaphragm connected to said rod and said housing at a location between said first and second housing ends, said diaphragm defining a chamber in said housing, said rod being movable in response to said proportional valve delivering pressurized fluid flow to said chamber, said first end having an opening of a preselected diameter therein, said rod having a preselected diameter and extending through the opening, said diameter of the rod being smaller than the diameter of the opening and defining a predetermined clearance therebetween, said predetermined clearance defining a controlled leakage path between the chamber and the atmosphere; and a proportional valve connected to said housing, said control means and a source of pressurized fluid flow, said proportional valve receiving said control signal and responsively controlling the pressure of the fluid flow delivered from the source of pressurized fluid flow to the housing, said linear rod being movable relative to the housing in response the fluid pressure to move the wastegate valve to said open and closed positions.

2. A control system, as set forth in claim 1, including a first conduit connecting said source of pressurized fluid flow to said proportional valve, a second conduit connecting said proportional valve to said housing, said first conduit delivering said pressurized fluid flow from said source to said proportional valve and said second conduit delivering said pressurized fluid flow from said proportional valve to said chamber, a fixed orifice connected in parallel with said second conduit and bleeding off a portion of the pressurized fluid flow delivered to said second conduit.

3. A control system for controlling turbocharger boost pressure of an internal combustion engine at various different altitudes, said engine having an intake manifold and an exhaust manifold respectively connected to a compressor section and a turbine section of a turbocharger, comprising:

a wastegate valve connected between said exhaust manifold and said turbine section, said wastegate valve being movable between an open position at which fluid flow exhausted by the engine is free to bypass the turbine and a closed position at which fluid flow exhausted by the engine is restricted from bypassing the turbine;

first means for sensing a speed of the engine and delivering a responsive speed signal;

second means for sensing a boost pressure of the engine and delivering a responsive boost signal;

third means for sensing a rack position of the engine and delivering a responsive rack position signal;

fourth means for sensing a barometric pressure and delivering a responsive barometric pressure signal;

control means connected to said first, second, third and fourth sensing means for receiving said speed, boost, rack position and barometric pressure signals, determining a boost error based on actual and target boost values for said speed, boost, rack position and barometric pressure signals, and delivering a responsive control signal, said control means including a processor, said processor determining a target boost value based on the speed, rack position and sensed barometric pressure signals, said processor selecting a boost value from a boost map, a boost offset value from a boost offset map, and combining said selected boost and offset boost values to determine said target boost value, said boost map value being a function of engine speed and rack position and said boost offset value being a function of engine speed and barometric pressure;

actuator means for receiving said control signal, responsively moving said wastegate valve toward one of the open and closed positions, and to a position between the open and closed positions;

said actuator means including:

a linear actuator having a housing and a rod connected to the wastegate valve and slidably connected to said housing; and a proportional valve connected to said housing, said control means and a source of pressurized fluid flow, said proportional valve receiving said control signal and responsively controlling the pressure of the fluid flow delivered from the source of pressurized fluid flow to the housing, said linear rod being movable relative to the housing in response the fluid pressure to move the wastegate valve to said open and closed positions.

4. A control system, as set forth in claim 3, wherein said proportional valve is a solenoid operated proportional air valve and said source of pressurized fluid flow is an air supply.

5. A control system, as set forth in claim 4, wherein said source of pressurized fluid flow includes a fluid passing conduit connecting the turbocharger compressed air supply to the proportional valve.

6. A control system, as set forth in claim 3, including a wastegate bypass conduit connected to the exhaust manifold and in parallel with the turbine section, said wastegate bypass conduit passing engine exhaust in bypass of the turbine section and to the atmosphere at the open position and at positions between the open and closed positions of the wastegate valve.

* * * * *